July 3, 1962

H. C. SIMMONS 3,042,317

VARIABLE AREA VALVE

Filed Dec. 9, 1959

INVENTOR.
HAROLD C. SIMMONS
BY
Oberlin, Maky & Donnelly
ATTORNEYS

«3,042,317
VARIABLE AREA VALVE
Harold C. Simmons, South Euclid, Ohio, assignor to Parker-Hannifin Corporation, Cleveland, Ohio, a corporation of Ohio
Filed Dec. 9, 1959, Ser. No. 858,422
1 Claim. (Cl. 239—453)

The present invention relates generally as indicated to a variable area valve for use either as a liquid (water or fuel) injector in a gas turbine power plant, or as a flow divider in conjunction with, for example, a dual orifice fuel injection nozzle for such power plant.

Basically, fuel injectors or nozzles, as used in gas turbines, may be classified as the simplex, duplex, dual orifice, and spill types. In order that the features and advantages of the present variable area valve (usually called a "variable area orifice") may be readily comprehended, these known nozzle types will now be generally described.

First of all, the simplex nozzle is a single orifice nozzle and is, of course, the simplest and least expensive of those enumerated above. However, the simplex nozzle has the disadvantage that it has a relatively narrow range of useful fuel flow (maximum to minimum) at which the mean droplet size is in the "fine mist" classification (less than about 150 microns) for efficient combustion. Following is a table of typical simplex nozzles and their characteristics assuming 500 p.s.i. as the maximum fuel pressure:

Table 1

| Nozzle Size (lbs./hr. @ 100 p.s.i.) | Fuel Flow For "Fine Mist" | | Useful Flow Range |
|---|---|---|---|
| | Minimum | Maximum (lbs./hr. @ 500 p.s.i.) | |
| 25 | 9 lbs./hr. @ 12 p.s.i. | 56 | 6:1 |
| 100 | 60 lbs./hr. @ 36 p.s.i. | 240 | 4:1 |
| 300 | 280 lbs./hr. @ 85 p.s.i. | 740 | 2.6:1 |

In the simplex nozzle the fixed orifice thereof is what meters the flow of fuel and therefore, such nozzle is subject to the square root law i.e. the rate of flow through the orifice is proportional to the square root of the applied fuel pressure, the fuel being admitted under pressure through tangentially directed swirl ports into a conical vortex chamber and acquiring an increasing whirl velocity as the diameter of the chamber decreases. The fuel is discharged from the orifice as a conical spray since it has both axial and tangential velocity components. The vortex chamber and orifice usually do not flow full, whereby there is an axial core of air or fuel vapor which persists in the base of the vortex chamber. At very low fuel pressures from zero to the minimums appearing in Table I the fuel discharge from the orifice is first a dribble, then a twisted jet, and then, as the fuel pressure approaches the minimum, the jet opens out to form a tulip-shaped liquid sheet with some break-up into coarse drops which may be referred to as "rain." As the fuel pressure is increased above the minimum, the fuel issues from the orifice in the form of a conical spray consisting of a cloud of fine particles.

In order to substantially extend the useful fuel flow range, resort has been made to the much more complex nozzles such as the duplex, dual orifice, and spill types previously mentioned. In the duplex nozzle, the extended useful fuel flow range may be achieved as by providing a sliding piston which forms the large end of the vortex chamber and which moves back against a spring under increasing pressure to thereby increase the swirl port area. A disadvantage of the duplex nozzle is the necessity of extreme accurate machining of the components, the difficulty of accurately matching a set of nozzles, and the difficulty of maintaining adequate sensitivity of the nozzle during the cut-in period of the larger swirl ports, whereby the fuel flow may vary widely without a corresponding change in fuel pressure. Another disadvantage is that there is friction of the sliding piston in the nozzle which renders the piston insensitive to small variations in pressure, and, in addition, particles of foreign matter may lodge between the piston and nozzle surfaces to cause sticking of the piston.

The so-called dual orifice nozzle is, in many respects, similar to that of the duplex nozzle and, as the name implies, there are usually provided two separate orifices in the dual orifice nozzle, whereby, at low pressures and low fuel flows, the fuel is discharged through a small or primary orifice whereas, at higher pressures and greater rates of fuel flow, fuel is discharged additionally through a larger or secondary orifice. While the dual orifice nozzle gives good atomization over a wide range of useful flow it requires careful design and matching of individual nozzles to avoid a sudden change in the pressure-flow characteristics. The cut-in point of the secondary orifice may be controlled as by check valves or by separate fuel manifolds. It has been proposed also to employ specially designed flow dividers in an attempt to provide the desired sensitivity of flow to pressure throughout the useful flow range which may be as great as 100:1, the present invention being adapted for such use as a flow divider.

The spill type nozzle above-referred to, has the advantage that it itself has no moving parts and is relatively easy to manufacture, the principle of operation thereof being that fuel is bled off the vortex chamber in varying amounts as controlled by a valve in the bleed line. Accordingly, a large amount of fuel at high pressure may be admitted into the vortex chamber to produce high whirl energy, but only a desired portion of this fuel is allowed to discharge through the nozzle orifice. The ideal condition of operation of this type of nozzle is that of constant inlet pressure with all control being effected by the spill valve, thus insuring constant high whirl velocity and hence fine atomization at all flows over a wide useful range. However, one chief disadvantage of the spill type nozzle is that a pump of relatively large capacity is required since the total flow, that is, the discharge plus the spill, may be several times that of the actual output required.

In a variable area orifice for use as an injector or as a flow divider as aforesaid, it is a universal practice to provide a valve body formed with a fluid flow passage therethrough, said passage, in turn, being formed with a valve seat for engagement by a spring-backed valve member which is movable under the influence of fluid under pressure away from the valve seat to thus increase the size of the opening through which the fluid flows. Ordinarily, the valve member is backed up by a coil spring and is formed with a stem or the like, which has a close axial sliding fit in the valve body for maintaining the valve member in accurate coaxial alignment with the valve seat but, owing to sliding friction, the valve member movements are rendered insensitive to small fluid pressure changes. Also, such coil springs, when compressed, tend to cant the valve member with respect to the valve seat, whereby the valve member is apt to stick and thus be rendered insensitive to fluid pressure variations. Another cause of valve member sticking may be the presence of fine particles of foreign matter in the fluid between the slide fitted surfaces of the valve member and valve body. Therefore, instead of the flow versus pressure characteristics of such injector or flow divider being a smooth curve as required for the accurate regulation or metering of flow responsive to fluid pressure change, there will be portions thereof in which the flow is insensitive to pressure change owing to sliding friction and sticking of the valve member.

With the foregoing in mind, it is a principal object of this invention to provide a variable area valve in which there are no sliding parts whereby movement of the valve member with respect to the valve seat does not entail any sliding friction.

It is another object of this invention to provide a variable area valve of the character indicated in which the valve member and valve body are connected together by spring means having but a single degree of freedom, specifically, freedom in an axial direction only whereby the valve seat and the valve member are, at all times, maintained in coaxial alignment without providing any axially sliding fits between the valve member and the body.

Another object of this invention is to provide a unitary subassembly of a valve body and valve member which can be easily pre-assembled and pre-tested before attachment to the main holder.

Another object of this invention is to provide a valve member and body assembly in which provision is made for axial adjustment of the valve member with respect to the valve seat, preferably so that the valve member in the no-load condition of the valve actuating spring means is in close proximity to, but out of contact with, the valve seat whereby pounding on the valve seat and indenting of the valve member is avoided.

It is another object of this invention to provide a variable area valve of the character indicated which, when employed as an injector, provides a high quality spray of the fluid under all operating conditions from zero to maximum flow and from minimum pressure to maximum pressure and provides an optimum flow versus pressure curve in which the flow is sensitive to pressure variations of small magnitude.

Still another object is to provide a variable area valve which can be used as an injector with which the desired fine spray is achieved without requiring the usual spin chamber commonly employed in injectors.

Still another object of this invention is to provide a unique method of assembly of the valve parts to insure accurate coaxial alignment and axial adjustment of the valve member with respect to the valve seat.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figures 1, 2:
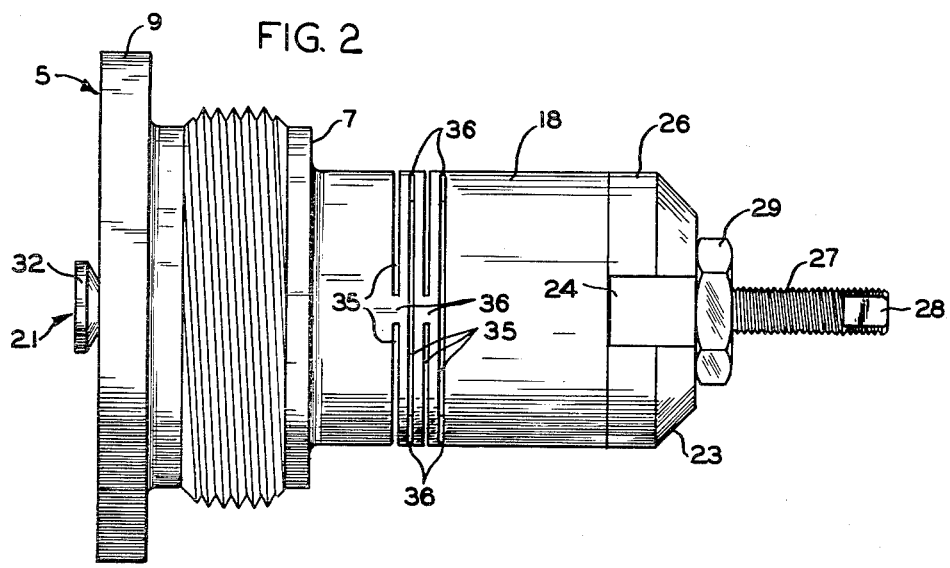
FIG. 1 is a central longitudinal cross-section view, on much enlarged scale, showing a preferred embodiment of a variable area valve adapted to be employed as an injector.
FIG. 2 is an elevation view of the valve member-valve body subassembly.

Referring now more particularly to the drawings, and first to FIGS. 1 and 2, there is provided a main holder 1 formed with external threads 2 at one end, with wrench flats 3 at the middle, and with internal threads 4 at the other end.

Screwed into the holder 1 is the valve body 5 which may be formed as with holes 6 for engagement with a spanner wrench or the like. Said valve body 5 is formed with a shoulder 7 which engages the internal shoulder 8 in the holder 1 and is also formed with a peripheral flange 9 which is axially spaced from the end face 10 of the holder to accommodate a refractory ring 11 as of carbon, for example, to serve as a barrier to prevent leakage of the weld metal 12 from reaching the interengaged threads of the holder 1 and body 5. Accordingly, should it be necessary for any reason to disassemble the valve body 5 from the holder 1 all that it is necessary to do is to cut away the ring of weld metal 12 down to the periphery of the refractory ring 11, whereupon the body 5 may be unscrewed from the holder 1. The axial gap between flange 9 and end face 10 is preferably slightly greater than the axial thickness of the refractory ring 11 for instance, about .010" or less, but even with such clearance it has been found that the weld metal 12 is prevented from leaking radially inward past the refractory ring 11 during the welding operation.

The valve body 5 herein is of tubular form including a discharge orifice 14 at one end forming a sharp corner seat 15, and a counterbore 16 at the other end joined to the orifice 14 by the frusto-conical bore 17 which forms a conical approach to the orifice 14.

The axially inner end portion 18 of the valve body 5 is of tubular cylindrical form as shown having an outside diameter less than the holder counterbore 19 and extending axially inwardly to a point short of the inlet bore 20 of the holder 1. The valve member 21 herein is formed in two parts including an outer part 23 formed with a plurality of axially extending slots 24 and with guide and head portions 25 and 26 which, respectively, are a force fit in the counterbore 16 of the valve body 5 and in abutting engagement with the axially inner end face of the body extension 18. Said outer part 23 extends axially forwardly toward the discharge orifice 14 but in radially spaced relation to the counterbore 16 and frusto-conical bore 17 of the body 5 whereby to define an annular flow passage leading to orifice 14.

Extending through the outer part 23 of the valve member 21 and having threaded engagement therewith, is the inner part 27 which, as shown, terminates in wrench flats 28 or the like by which said inner part 27 may be turned and thus axially adjusted with respect to the outer part 23. Locking of the inner and outer parts 23 and 27 in desired adjusted position is effected as by means of the lock nut 29. The inner part 27 is also provided with a cylindrical locating section 30 which is a close sliding fit in the counterbore 31 adjacent the front end of the outer part 23, so that in all adjusted positions of the inner part 27, the valve head 32 thereof will be maintained coaxial with the discharge orifice 14 and the valve seat 15 thereof. The head 32 is of frusto-conical form (preferably of about 120° included angle) which is joined to the locating section 30 by means of the neck portion 34, which, as evident, defines with the discharge orifice 14, an annular orifice through which fluid is adapted to flow when the frusto-conical valve head 32 is moved axially outwardly with respect to the seat 15.

In order to eliminate friction and the possibility of sticking, or erratic action, of the valve head 32 as it moves toward and away from the seat 15, the cylindrical extension 18 is formed with a plurality of transverse slots 35, herein four pairs of slots of which successive pairs are offset 90° circumferentially to thus form a yieldable connection between the fixed valve body 5 and the valve member 21 that has only one degree of freedom. In this case such one degree of freedom is in an axial direction so as to provide a substantially rigid connection in a radial or lateral direction. Thus, this yieldable connection maintains true coaxial alignment of the valve member 21 with respect to the valve seat 15 without providing any close fitting axially slidable parts.

Referring especially to FIG. 1, it can be seen that when fluid under pressure is acting on the valve head 21 on the diameter of the valve seat 15, a progressive increase in pressure will progressively force the valve member 21 axially toward the left, in accordance with the rate of the spring connection provided by slots 35. Such yielding movement of valve member 21 is effected without tending to cant or tilt the valve member 21 with respect to the valve seat 15. Accordingly, the conical surface of the valve head will be maintained in accurate coaxial alignment with the valve seat 15 so that the fluid will flow uniformly through the annular gap to produce a fine conical spray of the fluid.

Referring further to the aforesaid spring connection between the valve member 21 and the valve body 5, it can be seen that the several pairs of diametrically opposed and uniformly circumferentially offset bridges 36 afford a high degree of rigidity of the axially inner end portion of the extension 18 with respect to the forwardly adjacent portion in all directions except an axial direction.

Figure 3:
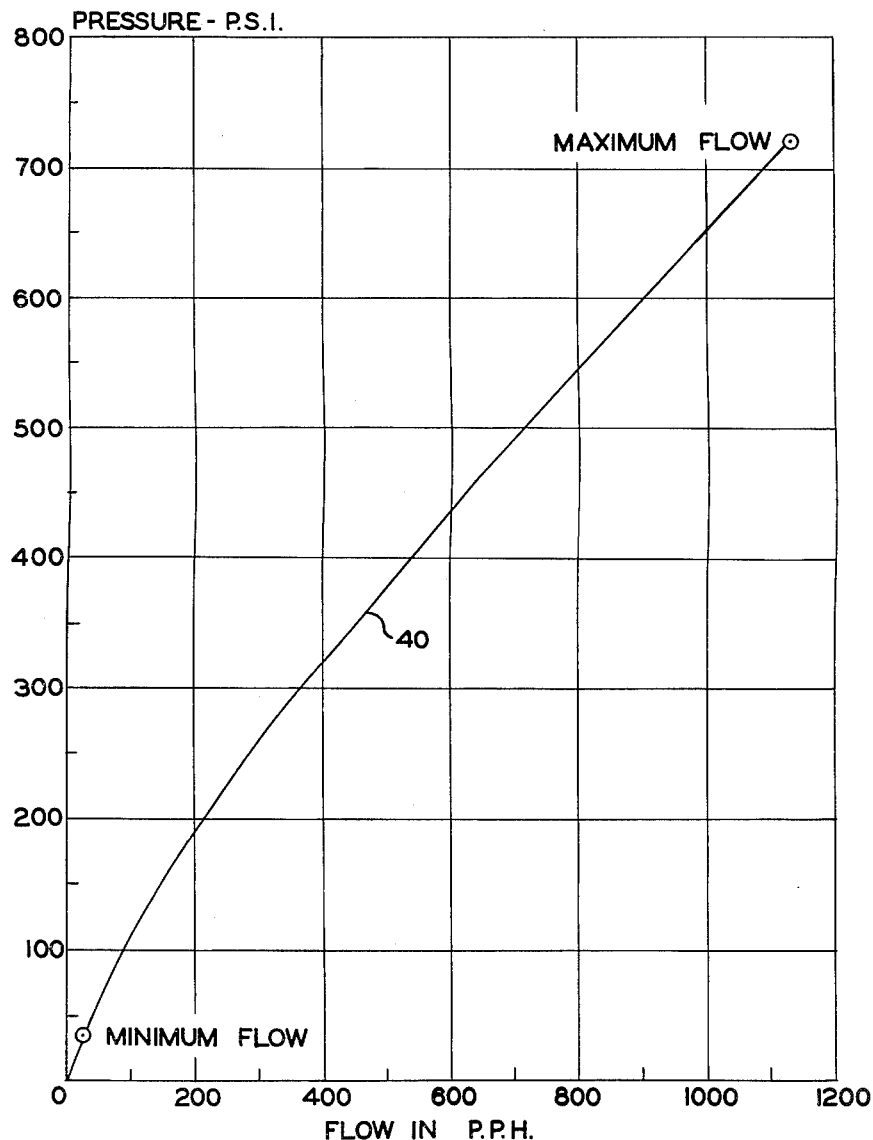
FIG. 3 is a typical flow versus pressure curve obtainable with a variable area valve of the type shown in FIGS. 1 and 2.

FIG. 3 shows a typical flow versus pressure curve 40 wherein the flow versus pressure curve is nearly a straight line providing a usable fuel flow ratio of about 45:1 that is, about 1130 lbs./hr. maximum flow at 725 p.s.i. pressure and minimum flow of about 25 lbs./hr. at 35 p.s.i. pressure. In that entire range the fuel will be discharged as a fine mist as required. Moreover, because the movements of the valve member 21 occur without sliding friction, there will be no sticking thereof or other erratic action due to friction and/or misalignment of the valve member 21 with respect to the discharge orifice 14.

Another feature of this invention which has already been briefly mentioned, is the provision of axial adjustment for the valve head 32 relative to seat 15 and it has been found important to provide a small initial gap between the conical face of valve head 32 and the valve seat 15 which may be .003″ for example which provides the zero flow condition of curve 40 in FIG. 3. Thus, the valve head 32 cannot pound against the valve seat 15, whereby a sharp edge orifice 14 will be maintained at all times without danger of forming an indentation or groove in the conical face of the valve head 32. This initial clearance also compensates for temperature variations. Actually, this .0003″ gap is essentially the zero flow position and in one specific example, the gap will be approximately .0010″ at the "Minimum Flow" position as identified in FIG. 3 and will increase about twenty times to about .020″ at the "Maximum Flow" position. Experience has shown that these figures are an excellent compromise to achieve good spray quality at low pressures and sensitivity of flow to pressure fluctuations despite presence of contaminant particles in the fluid. It will be noted that when the variable area valve is not operating there is no load on the spring connection formed by slots 35 and bridges 36 and, therefore, high soak temperatures will not cause loss of load. Yet another feature of the spring connection herein is that there is no torsion about the axis as encountered with coil springs and the like.

With reference to the method of making and assembling the instant variable area valve, it is, of course, a simple matter to provide different characteristics in the spring element simply by changing either or both the inside and outside diameters of the tubular extension 18, changing the widths or spacings of the transverse slots 35, or changing the circumferential widths of the bridges 36 between the slots and, of course, for any particular desired characteristics these may be changed ever so slightly as by honing the counterbore 16 of the extension 18. In any event, the counterbore 16 and discharge orifice 14 may readily be made coaxial by grinding the same during a single chucking of the body 5. Similarly, the cylindrical portion of the outer part will be finished to a diameter just barely larger than the counterbore of the body so that these parts will fit together with a force fit. Likewise, the cylindrical guide portion 25 of the outer part 23 will be accurately located with respect to the locating counterbore 31. Finally, the inner part 27 will have its conical valve head 32 ground at the same time as the grinding of the outside diameter of the locating section 30 is done so that these two portions will be coaxial. When the inner and outer parts 23 and 27 are screwed together, the counterbore 31 and locating section 30 will be closely telescoped one within the other so as to maintain the conical seating surface of the valve head 32 coaxial with the guide portion 25, whereupon that concentricity will be maintained when the outer part 23 is force fitted into the extension 18, and thus the conical seating surface of the valve head 32 will be concentric with the valve seat 15 defined at the exit end of the discharge orifice 14. After the inner and outer parts 27 and 23 have been assembled together one may, if he wishes, perform a final precision truing operation (not really necessary) to make the conical seating surface of the valve head 32 concentric with the cylindrical guide portion 25. Following this, then, the inner and outer parts 27 and 23 are separated with the outer part 23 force fitted into the valve body 5 and the inner part 27 inserted through the discharge orifice 14 with its threaded stem screwed into the outer part 23. As aforesaid, it is preferred to maintain, in the no-load condition of the spring connecting means, to have the conical seating surface of the valve head 32 spaced minutely from the sharp edge seat 15 of the discharge orifice 14, viz, for example, .0003″. With the inner part 27 thus adjusted with respect to the valve seat 15 as by turning the stem through the wrench flats 28, the lock nut 29 will be drawn up against the inner end of the outer part 23.

For use as in a gas turbine, the variable area valve herein may have a valve head 32 of say .119″, a neck 34 of .038″ diameter extending through a discharge orifice 14 of .082″ diameter. For optimum results in desired spray pattern and spray quality, it has been found that the conical seating surface of the valve head 32 should have an included angle of about 120°. Of course, this included angle may range from say, about 100° to as much as about 150°. Accordingly, the fluid will have imparted thereto not only an axial velocity component, but in addition, a substantial radial velocity component, whereby the normally employed swirl slots and vortex chamber are not required.

Although the flow versus pressure characteristics are nearly a straight line function of moderate slope, the slope may be either increased, or decreased, by changing the rate of the spring connecting means which joins the valve member 21 to the valve body 5. Should it be desired to modify the flow versus pressure characteristics of this valve, the slots 24 in the valve member 21 may be varied in number, or in cross-section size and/or length, to constitute a restriction or control orifice, whereby the pressure drop thereacross will result in the fluid pressure acting on an area of the valve member 21 which is substantially greater than the cross-section area of the discharge orifice 14. Such a variable area valve may be used either as an injector or as a flow divider. With such arrangement, the flow versus pressure curve may at low pressures and low flows have a moderately steep slope to provide good sensitivity of flow to pressure change, whereafter in the intermediate and high ranges of flow and pressure, the curve may have less slope so that the flow increases at a proportionately higher rate in relation to pressure increase than in the early stages, whereby a substantial maximum flow is obtained with moderately low maximum pressure, the lower slope portion of the curve being due to takeover of the opening control function by secondary orifices (herein slots 24) which are predeterminedly related to the discharge orifice (herein orifice 14). In the present case, the number and sizes of the slots 24 may be changed to obtain somewhat different results, but having in this case, the advantage of no sliding friction and concentric location of the valve member 21 relative to the valve seat 15 so that the valve member 21 can move in accordance with change in pressure without sticking or lagging due to friction or to tilting or misalignment. In order to achieve a uniform spray pattern and uniform droplet size in the spray, it is of course necessary to maintain concentricity between the conical seating surface of the valve head 32 and the valve seat 15 in all positions of the valve member 21. If these parts are eccentric even a very slight amount, the width of the gap on one side may be much larger than on the opposite side, whereby the stream of fluid issuing through the wide portion of the gap will not be nearly as finely divided as that issuing from the narrow portion of the gap. Furthermore, such misalignment would cause a substantial departure from the desired flows in pounds per hour with respect to fluid pressures, and thus it would be practically impossible to match the discharge of a plurality of nozzles or injectors, despite the maintenance of identical fuel pressures in the fuel manifold to which the inlet passages 20 are communicated.

Other modes of applying the principle of the invention may be employed, change being made as regards the details described, provided the features stated in any of the following claims, or the equivalent of such, be employed.

I therefore particularly point out and distinctly claim as my invention:

A variable area valve comprising a valve body having a passage for conducting fluid therethrough and a valve seat; an axially yieldable, laterally rigid spring means integrally joining together one portion of said body for axial movement with respect to another portion that contains said seat; said spring means comprising a tubular portion of said body that is transversely slotted to provide axially adjacent pairs of diametrically opposed and circumferentially offset bridges; and a valve member axially and laterally fixedly secured to said one portion and having a head disposed adjacent to said seat and extending into said another portion in radially spaced relation whereby fluid pressures of different magnitude acting on said valve member moves said head thereof axially toward or away from said seat without sliding friction of said valve member in said another portion.

References Cited in the file of this patent

UNITED STATES PATENTS

| | | |
|---|---|---|
| 1,457,701 | Hesselman | June 5, 1923 |
| 1,498,034 | Hesselman | June 17, 1924 |
| 1,525,156 | Teufl | Feb. 3, 1925 |
| 2,421,887 | Huthsing | June 10, 1947 |
| 2,574,812 | Bradford | Nov. 13, 1951 |
| 2,701,412 | Wahlin | Feb. 8, 1955 |
| 2,749,182 | Campbell | June 5, 1956 |
| 2,756,108 | Warren | July 24, 1956 |

FOREIGN PATENTS

| | | |
|---|---|---|
| 97,829 | Austria | Sept. 10, 1924 |
| 593,029 | Germany | Feb. 20, 1932 |